July 26, 1966 W. B. ABBOTT ETAL 3,262,554
MAIN DRIVE MECHANISM FOR LINECASTING MACHINES
Filed Oct. 29, 1963 2 Sheets-Sheet 1
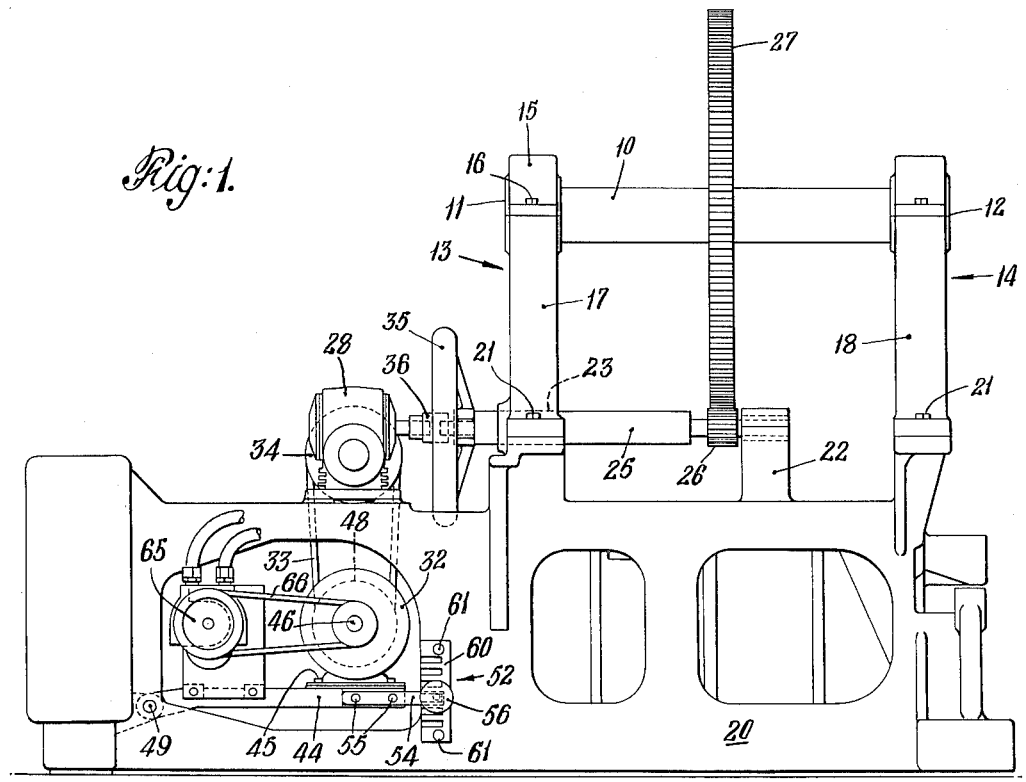
Fig. 1.
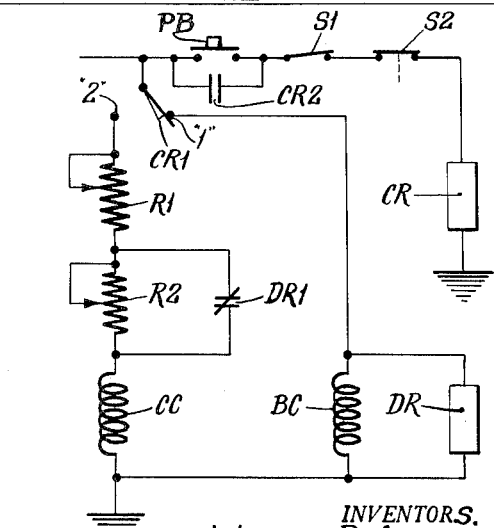
Fig. 4.
Fig. 5.
INVENTORS.
WILLIAM B. ABBOTT
BY HERBERT KLEPPER
ATTORNEY July 26, 1966  W. B. ABBOTT ETAL  3,262,554
MAIN DRIVE MECHANISM FOR LINECASTING MACHINES
Filed Oct. 29, 1963
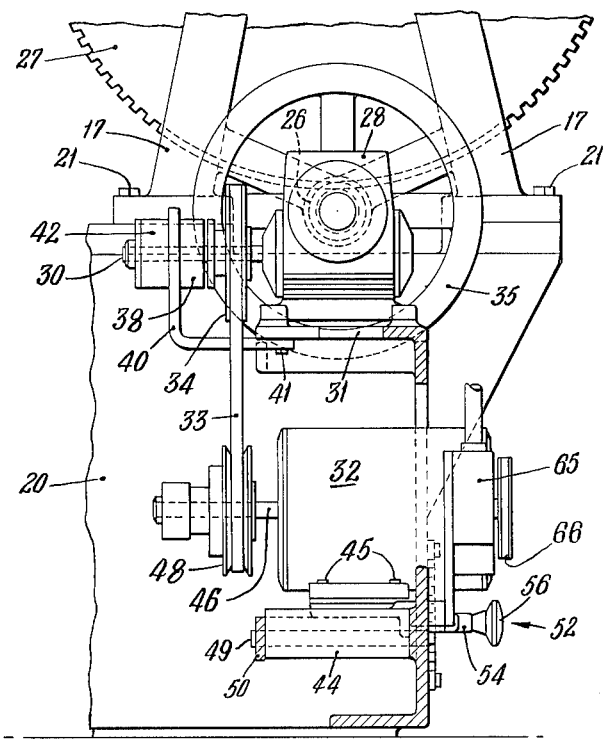
Fig: 2.
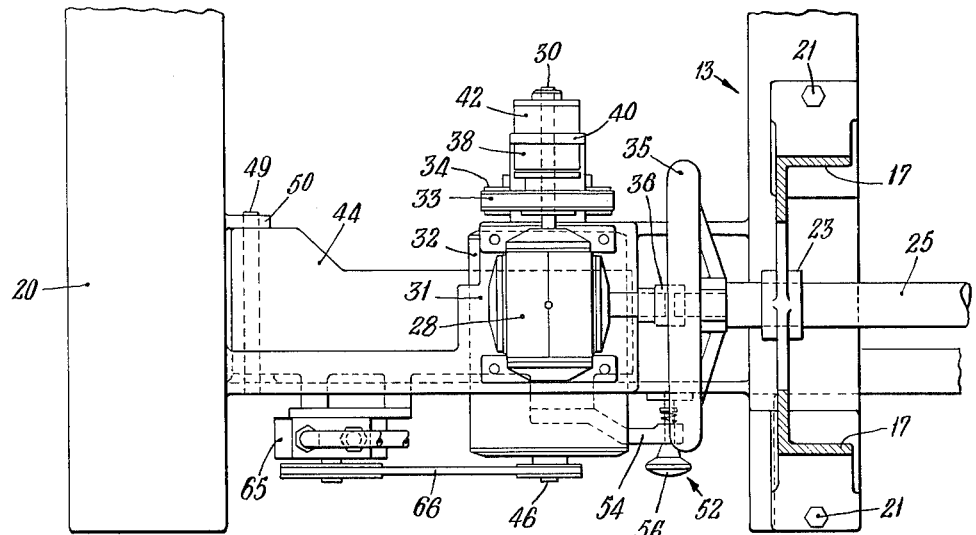
Fig: 3.
INVENTORS.
WILLIAM B. ABBOTT
BY HERBERT KLEPPER
ATTORNEY ic scheme United States Patent Office 3,262,554
Patented July 26, 1966

3,262,554
MAIN DRIVE MECHANISM FOR LINE-CASTING MACHINES
William B. Abbott, Pleasantville, and Herbert Klepper, Brooklyn, N.Y., assignors to Eltra Corporation, a corporation of New York
Filed Oct. 29, 1963, Ser. No. 319,811
2 Claims. (Cl. 199—11)

This invention relates to typographical linecasting machines in which the initiation and sequencing of machine operations are controlled by a plurality of cams mounted on a rotating main cam shaft, and more particularly to a drive mechanism for such shaft.

In commercial machines of the above type the main cam shaft makes one complete revolution for each machine cycle. Since cycles recur continually but intermittently, means must be provided to start and stop rotation of the cam shaft at the beginning and the end of each machine cycle. In the prior art mechanism the main cam shaft is driven through a gear and pinion, the latter being mounted on a drive shaft. The drive shaft is intermittently rotated by a continuously running electric motor connected to the shaft through the medium of a mechanical clutch mechanism. In general the motor is belt connected to a driving pulley which is free to turn on the drive shaft. The inside diameter of the pulley is engaged by a pair of clutch shoes carried by a clutch member keyed to the drive shaft. A spring normally biases the clutch shoes out of engagement with the driving pulley so that the drive shaft is at rest. When it is desired to initiate a machine cycle, a linkage mechanism connected to the line delivery mechanism causes the clutch shoes to engage the driving pulley and so begin rotation of the drive shaft. At the end of a machine cycle, a linkage mechanism actuated from the vise automatic disengages the clutch mechanism. All of this is known to those skilled in the art but it has been repeated here for purposes of review.

While the foregoing mechanisms have operated satisfactorily for a long time, it cannot be denied that they have been relatively complicated, particularly with respect to the starting and stopping linkages, and that frequent adjustments have had to be made to the component elements to insure proper operation of the mechanisms.

Accordingly, it is the object of the present invention to provide a simplified, improved cam shaft drive mechanism.

In carrying out the present invention an electrically operated clutch is interposed between the main cam shaft and the electric driving motor. More specifically, the clutch is operatively connected to the drive shaft. Energization and deenergization of the clutch is effected through electric switches which will operate at the beginning of the line delivery operation and at the completion of one rotation of the main cam shaft. When the clutch is deenergized at the end of a machine cycle a further circuit is completed to energize an electromagnetic brake which aids in arresting rotation of the cam shaft. Further means are provided to control energization of the clutch so that full torque from the motor is not delivered to the main cam shaft until rotation of the latter is begun. In this manner problems of shock loading which would otherwise be present in high speed linecasting machines are obviated.

Features and advantages of this invention may be gained from the foregoing and from the description of a preferred embodiment thereof which follows.

In the drawing:

FIG. 1 is a rear elevational view of a portion of a line casting machine showing the elements of the present invention;

FIG. 2 is an enlarged fragmentary side elevational view with some of the framework removed and certain of the parts shown in section;

FIG. 3 is an enlarged fragmentary top view of the elements shown in FIG. 2;

FIG. 4 is a detail of the selector latch device for positioning the motor platform; and FIG. 5 is a diagrammatic representation of electric operating means for energizing the electric clutch of the present invention.

Referring now to FIG. 1 of the drawings, there is shown the main cam shaft 10. None of the usual cams are shown thereon since these are otherwise well known and they do not aid in an understanding of this invention. This shaft, as is the common practice, is mounted in bearings 11 and 12 which in turn are mounted in the spaced-apart side frames 13 and 14. It will be noted that the top cap 15 of each bearing is secured to its respective side frame by securing means 16. Inspection of the bearings on removal of the shaft can thus be easily accomplished by removal of these caps. Each side frame terminates at its lower end in two angle shaped legs 17 and 18 which are provided with base plates fastened to the base casting 20 of the machine by bolts 21.

The base casting 20 is provided with a bearing housing 22 while side frame 13 is also provided with a support bearing 23. Both these bearings support drive shaft 25 which is provided with a driving pinion 26 keyed thereto that meshes with a much larger gear wheel 27 mounted on the main cam shaft 10. Shaft 25 terminates at its left end within a gear box enclosure 28. Within this housing a wheel or small pinion fixed to shaft 25 is in mesh with a drive worm gear provided on a shaft 30 mounted at a right angle to shaft 25 in gear box 28. The gear box 28, in turn, is mounted on a plate member 31 which is a part of the base casting 20. It should be apparent that when shaft 30 is rotated, the main cam shaft will also rotate in a direct relationship thereto, which relationship, of course, depends upon the size of the various gearing elements. The power for operating shaft 30 is provided by a continuously operated synchronous motor 32 which by means of belt 33 operates pulley 34. This pulley is rotatably mounted on shaft 30 and by means of a magnetic clutch and brake arrangement, to be later described, is capable of being engaged and disengaged from the shaft 30.

A hand wheel 35 has been provided to allow the main cam shaft 10 to be manually positioned if desired. This wheel is fixedly mounted on shaft 25. As clearly seen in FIG. 3, shaft 25 actually comprises two shafts that are joined together by means of a flexible coupling 36 that is ready to yield slightly as shaft 25 begins to turn when the electric clutch is energized. This yielding action helps to reduce shocks to all the mechanisms operatively connected to the main cam shaft.

Electric clutch 38 can be of any standard construction and for that reason will be described briefly. The previously mentioned pulley 34 is rotatably mounted on shaft 30. This pulley is provided with a cylindrical extension member, the outer surface of which is splined. Mounted on this member by a mating splined connection is a clutch plate. Thus this plate while adapted to rotate with pulley 34 is capable of independent transverse movement along the axis of shaft 30. Fixedly mounted to shaft 30, by say a key, is a face plate member, which has a portion provided to cooperate with an associated disc face of the clutch plate. Such engagement takes place when the clutch coil CC is energized, causing the clutch plate to be pulled into engagement with the mounted face plate, thereby allowing motor 32 to drive the main cam shaft 10 as pulley 34 is interconnected to shaft 30. Coil CC is mounted about a hub of a housing which is securely mounted to the support end plate 40 which in turn is fixed by bolt 41 to plate member 31. Briefly, then, when coil CC is energized a magnetic flux is produced which acts upon the clutch plate causing it to move into engagement with the face plate.

The brake arrangement 42 is similar to electric clutch 38. Brake coil BC is mounted about a hub of a housing secured to end plate 40. Mounted on shaft 30 by means of a key is a disc element. Splined to this disc is a brake plate. When the brake coil BC is energized the brake plate translates and its engaging surface cooperates with a surface formed on the fixed housing. This action prevents the rotation of shaft 30 and consequently rotation of the main cam shaft 10.

The electric means for operating the clutch coil CC and the brake coil BC will now be explained. For illustrative purposes switch PB can be considered to be closed during the delivery of a line by the line delivery slide. This operation and the functioning of a line delivery slide will be well understood by those skilled in the linecasting machine art, and suffice it here to say that line delivery is initiated either under manual push button control or by a tape actuated operating unit or by the raising of an assembly elevator. When switch PB is open, contact CR1 is in its first position and the main cam shaft is held at rest as the brake coil BC is energized. Also, in this position a slow dropout relay DR is activated. Actuation of the start switch PB will energize control relay CR; providing of course that switches S1 and S2 are closed. When relay CR is energized, contact CR1, in moving to its second position, opens the circuit to the cam shaft brake coil BC and relay DR and then closes the power circuit to the clutch coil CC. In addition, contact CR2 closes to complete a holding circuit for relay CR by passing switch PB. Normally closed switch S2 mounted on the main cam shaft is so arranged that after the completion of a machine cycle it quickly opens and closes. The opening of switch S2 deenergizes relay CR which results in contact CR2 opening and moves contact CR1 to its first position (as shown in the drawing) preparing the circuit for the next machine cycle. Switch S1 is representative of a number of safety switches that can be used with this circuit. So, if during the machine cycle switch S1 is opened, the brake coil BC will thereafter be energized and the main cam shaft will stop rotating. Therefore, for the purpose of this disclosure, switch S1 can be assumed to be any of a number of the well known line casting safety switches; for example, the tight line safety, spaceband safety, or the mold slide safety switch.

When contact CR1 is moved to its second position, normally closed contact DR1 remains open for a preselected interval chosen in the order of about 300 milliseconds. Thus, immediately after contact CR1 is moved to its second position, brake coil BC is cut out and a current is completed through resistors $R_1$ and $R_2$ and out to ground by way of coil CC of the electric clutch. When contact DR1 closes 300 milliseconds later, resistor $R_2$ will be shunted out, thereby placing only resistor $R_1$ in series with the clutch coil CC. By this simple method the current through coil CC is reduced during the initial movement of cam shaft 10 to allow a certain amount of slippage in the electric clutch. This will help to lessen the shock problems inherent in the acceleration of the cam shaft mass of a line casting machine.

Both resistors $R_1$ and $R_2$ are of an adjustable type and therefore resistor $R_2$ may, by proper adjustment, vary the effective starting torque deliverable to the main cams shaft 10. Similarly, an adjustment of resistor $R_1$ will vary the available running torque. At the end of a revolution of the cam shaft 10 contact CR1 will be returned to its first position, which action immediately de-energizes clutch coil CC while energizing coil BC and relay DR.

The main source of power for cam shaft 10 is as aforementioned electric motor 32, shown fixedly mounted upon a platform bed 44 by securing means 45. Secured to the rear end of the motor drive shaft 46 is a variable pitch type pulley 48. The effective drive diameter of this pulley may be carried while the tension in the belt 33 is automatically maintained. It should be clear that by varying the effective diameter of pulley 48 the output speed of cam shaft 10 is also varied. Pulley 48 is of the self adjustable variety and is provided with the usual two disc shaped members which are spring biased towards each other. The contours of the cooperating surfaces of the discs are such that they form a grooved shaped track in which the belt 33 can ride. As the pulley 48 is pivoted downwardly the belt 33, being virtually inextensible, transmits a spreading lateral force to the disc members which compose pulley 48 to move them apart decreasing the drive diameter of pulley 48 which consequently decreases the output speed of the driven pulley 34 and the main cam shaft 10. Conversely, as the motor 32 is moved towards shaft 30, said shaft will be driven faster as a result of the larger effective diameter of pulley 48.

Platform 44 is pivotably mounted on a shaft 49 which is secured in two spaced apart bracket members 50 found on the machine base. This platform is prevented from pivoting in a clockwise sense by a selector latch device 52. An arm 54 of device 52 is by means of bolts 55 fastened to platform 44. Handle 56 is provided with a rod 57 that projects through an aperture in arm 54. As clearly shown in FIG. 4, compression spring 58 acting between a washer 59 loosely connected to rod 57 and arm 54 biases the rod into engagement with a slot of a detent member 60. This member 60 is secured by bolts 61 to the base of the machine 20 and by means of its transverse slots 62 allows an operator to select various main cam shaft speeds. For example, if it is desired to reduce the operating speed of the linecasting machine, all that need be done is to pull handle 56 outwardly to disengage shaft 57 from the slot wherein it was located and thereafter lower platform 44 on its pivot shaft 49, until the desired speed range is reached. Thereafter release of handle 56 allows spring 58 to drive shaft 57 into engagement with the slot now in registry therewith. Similarly, by raising platform 44 the operating speed of the machine (main cam shaft) will be increased.

As seen in FIG. 1, motor 32, in addition to actuating the main cam shaft 10, also can be used to drive an hydraulic pump 65 through the medium of belt 66. Such a pump could be used in a hydraulic quadding device of the variety shown in U.S. Patent 2,806,585. Still other pulleys could be mounted on shaft 46, if desired, for driving belts to operate the assembly mechanism, a taped controlled unit or the intermediate shaft of the machine.

It is understood that many changes and variations can be made in the preferred embodiment disclosed without departing from the spirit and scope of the invention. Therefore, the foregoing specification and drawings are to be interpreted in an illustrative rather than a limiting sense.

What is claimed is:

1. A linecasting machine having a main cam shaft that is rotated in one revolution cycles and a plurality of cams mounted thereon to control the sequential operation of said machine to produce a typographical slug during each revolution of the cam shaft, said machine comprising a speed reducer having an input shaft and an output shaft, means connecting said output shaft to the main cam shaft, a variable speed drive for said input shaft including a motor, an electrically controlled clutch for connecting said drive to said speed reducer input shaft, an electrically controlled brake for applying a braking force to said input shaft, line delivery means for energizing said clutch to connect said drive to said speed reducer input shaft and for deenergizing said brake to thereby release the braking force from said speed reducer input shaft, said line delivery means being actuated when a composed line of matrices and spacebands is transferred to the first elevator of the machine, and electrical switch means which are momentarily actuated at the completion of one revolution of the main cam shaft to deenergize said clutch and energize said brake.

2. A linecasting machine according to claim 1 wherein said variable speed drive includes a variable pitch pulley, a mounting platform for the motor pivotally attached to the linecasting machine base, and means for securing said platform in a selected one of a plurality of positions whereby the casting speed of said machine can be varied as desired.

References Cited by the Examiner
UNITED STATES PATENTS

| | | | |
|---|---|---|---|
| 2,296,979 | 9/1942 | Byrne | 226—41 X |
| 2,737,278 | 3/1956 | Bartelt | 192—142 X |
| 2,924,318 | 2/1960 | Smith et al. | 192—142 |
| 3,042,282 | 7/1962 | Martin et al. | 226—190 |
| 3,068,997 | 12/1962 | Lawson | 199—20 |

DAVID KLEIN, *Primary Examiner.*

DON A. WAITE, *Examiner.*

ARTHUR McKEON, *Assistant Examiner.*